United States Patent [19]

Toutant et al.

[11] Patent Number: 4,878,368
[45] Date of Patent: Nov. 7, 1989

[54] ADAPTIVE ROLL FORMED SYSTEM AND METHOD

[75] Inventors: Roy T. Toutant; David S. Perry, both of Louisville; Michael A. Brennan, Prospect; James E. Kreko; Mark A. Dilk, both of Louisville, all of Ky.

[73] Assignee: General Electric Company, Louisville, Ky.

[21] Appl. No.: 129,007

[22] Filed: Dec. 4, 1987

[51] Int. Cl.⁴ .............................................. B21D 5/08
[52] U.S. Cl. .......................................... 72/9; 72/12; 72/178; 72/181
[58] Field of Search ...................... 72/9, 12, 178, 176, 72/181, 182

[56] References Cited

U.S. PATENT DOCUMENTS

| 2,974,710 | 3/1961 | Braeuninger | 72/178 |
| 3,081,651 | 3/1963 | Roberts | 72/9 |
| 3,342,047 | 9/1967 | Briggs | 72/9 |
| 3,431,761 | 3/1969 | Clement | 72/9 |
| 3,650,135 | 3/1972 | Skelton et al. | 72/9 |
| 3,756,050 | 9/1973 | Kubo et al. | 72/9 |
| 3,852,983 | 12/1974 | Cook | 72/12 |
| 3,955,389 | 5/1976 | Foster | 72/9 |
| 4,215,558 | 9/1980 | Shiguma et al. | 72/9 |
| 4,528,756 | 7/1985 | Ichihara | 72/12 |
| 4,713,592 | 12/1987 | Memmel | 72/12 |

FOREIGN PATENT DOCUMENTS

| 94719 | 7/1980 | Japan | 72/9 |
| 117815 | 9/1981 | Japan | 72/9 |

Primary Examiner—Daniel C. Crane
Attorney, Agent, or Firm—Frederick P. Weidner; Radford M. Reams

[57] ABSTRACT

A refrigerator cabinet has a front flange, which as a gasket on its door seal thereagainst when the door is closed, formed by a plurality of longitudinally spaced sets of rollers of a roll forming machine so that the front flange is at a specific angular relation to a top wall of the refrigerator cabinet when the roll formed part is fabricated into a portion of the refrigerator cabinet. The angular relationship of the flange and the top wall of the refrigerator cabinet is determined at a first fabrication station of a roll formed part, which forms a portion of the refrigerator cabinet after fabrication, by two linear variable differential transformers engaging each of the two adjacent surfaces of the roll formed part that will constitute the front flange and the top wall of the refrigerator cabinet and transmitting signals indicating the angle therebetween to a personal computer. If the measured angle does not fall within a predetermined range, a roller of the last set of rollers of the roll forming machine is adjusted through a motor controller while production continues. This adjustment is accomplished by the motor controller sending a signal to an adjustment motor, which turns a screw to vary the position of a roller of the last set of forming rollers of the roll forming machine. The amount of movement of the adjusted roller is measured by an electronic gage with a data system recording the actual amount of adjustment.

20 Claims, 14 Drawing Sheets

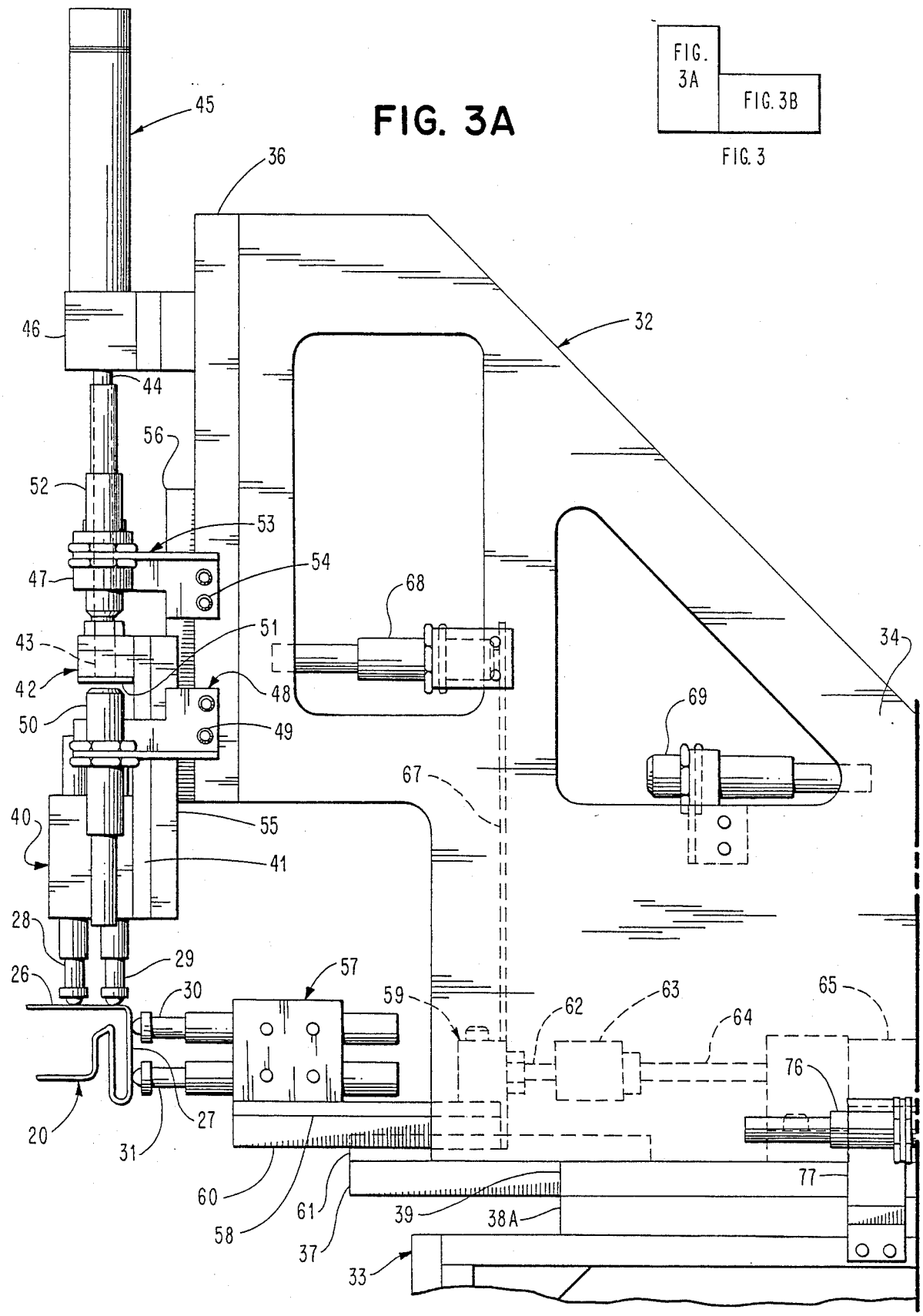

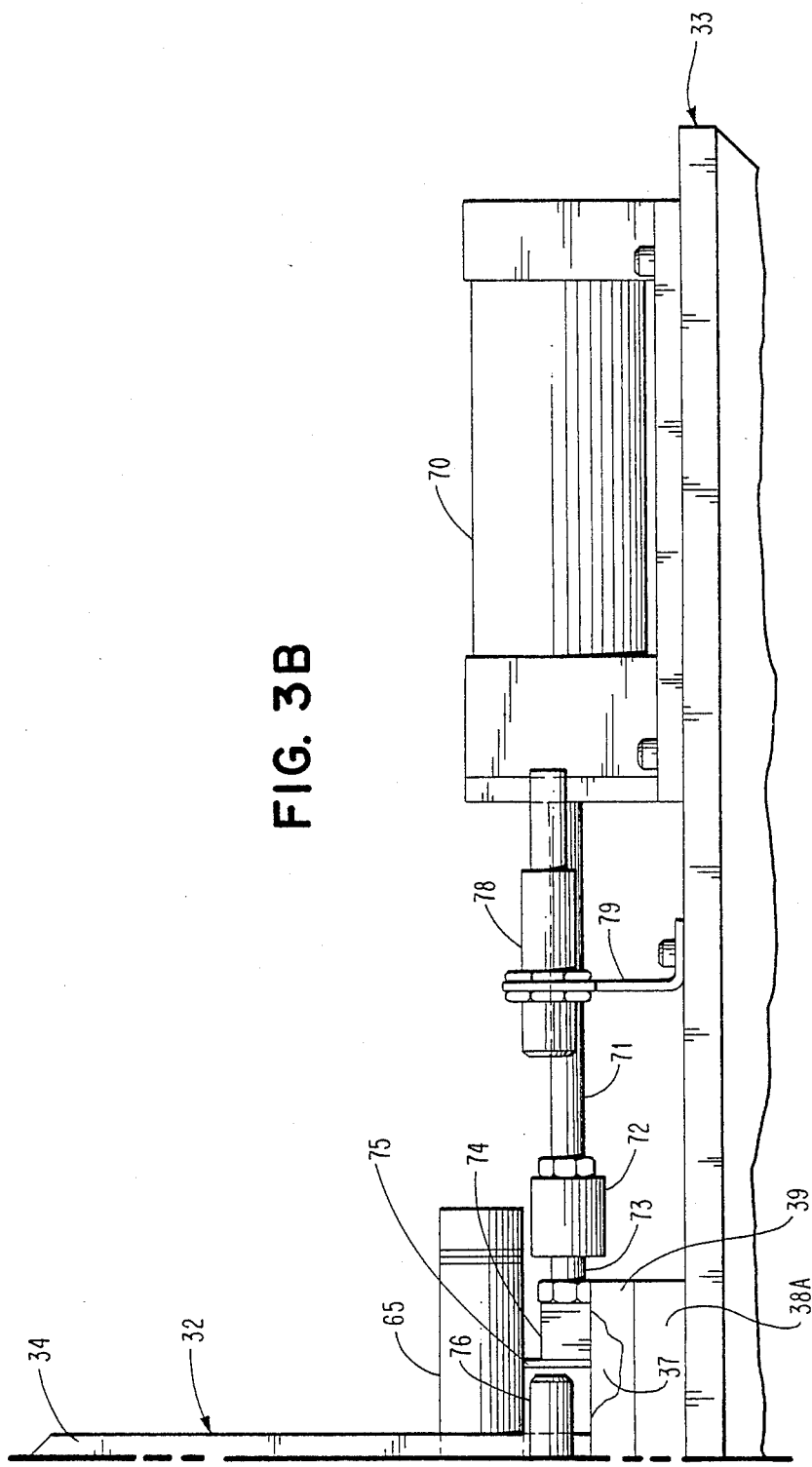

4,878,368

ADAPTIVE ROLL FORMED SYSTEM AND METHOD

FIELD OF THE INVENTION

This invention relates to a system and method for controlling the angle between two surfaces of a roll formed part and, more particularly, to a system and method for automatically adjusting the position of at least one roller of a roll forming machine when the relation between two adjacent surfaces of a roll formed part is not within a predetermined range.

BACKGROUND OF THE INVENTION

A roll forming machine has a series of large powered rollers to progressively bend a sheet of metal as it passes therethrough. When the sheet of metal is bent by the rollers past its elastic limit, the metal tends to spring back towards its original shape when the sheet of metal is released. Compensation for this spring back effect may be made by bending the sheet of metal past its desired final shape so that the sheet of metal will have the approximate correct shape after it springs back towards its original shape. However, the magnitude of the spring back varies in accordance with the thickness of the material and its metallurgical properties. Lots of sheet metal can vary significantly as to both the metallurgical properties and the material thickness so as to prevent each lot of sheet metal from obtaining the approximate correct shape if compensation for the new lot is not made.

To improve product quality, it is necessary to reduce the dimensional variations of the sheets of metal. The reduction of dimensional variations has previously been obtained by manually adjusting rollers of a roll forming machine to provide varying amounts of overbending in accordance with the metallurgical properties and the material thickness of a particular lot of sheet metal. Because the required gaging and adjustment processes are tedious and inexact when performed manually, adjustment of the rollers of a roll forming machine has been performed infrequently. As a result, the desired quality of the roll formed part has not been obtained.

This problem of the bent sheet metal having the desired final shape after being bent by a roll forming machine is particularly noticeable where the bent surface of a roll formed part must have a specific relation to a separate part with which it cooperates. For example, the front flange of a refrigerator cabinet surrounding the refrigerator cabinet opening must be substantially flat to enable a gasket of a door of the refrigerator cabinet to seal effectively against the front flange.

The system and method of the present invention satisfactorily solves the spring back problem through automatically sensing the need for adjustment of a roller of a roll forming machine and performing the adjustment in a precise manner. The system and method of the present invention measures the angle between the adjacent surfaces of a roll formed part that constitute the front flange of the refrigerator cabinet and the adjacent refrigerator cabinet wall with which it is connected after fabrication of the roll formed part to determine whether the angle is within a predetermined angular range. If the angle between the adjacent surfaces of the roll formed part is not within the predetermined angular range, then a roller of the roll forming machine is automatically adjusted to obtain the desired angle between the adjacent surfaces of the roll formed part.

SUMMARY OF THE INVENTION

The system and method of the present invention measures each of the roll formed parts after formation of the roll formed part is completed and the roll formed part is stationary. The measured angle is stored in a computerized gage data system, which is programmed to determine whether adjustment of the roll forming machine is needed to correct the angular relation between the adjacent surfaces of the roll formed part. If adjustment of the roll forming machine is required, production continues while the adjustment is made.

Adjustment is made by an adjustment motor turning a screw to vary the position of a roller of a set of forming rollers of the roll forming machine. An electronic gage measures the amount of movement of the adjusted roller and the gage data system records this actual amount of adjustment.

An object of this invention is to improve the quality of a roll formed part.

Another object of this invention is to automatically adjust the angle of a roller of a roll forming machine forming a surface at a specific angle to another surface of the same sheet of metal.

A further object of this invention is to control the angle of a roll formed surface of a refrigerator cabinet against which a door gasket seals.

Other objects of this invention will be readily perceived from the following description, claims and drawings.

BRIEF DESCRIPTION OF THE DRAWINGS

The attached drawings illustrate a preferred embodiment of the invention, in which:

FIG. 3 is a block diagram showing how FIGS. 3A and 3B are arranged;

FIGS. 3A and 3B are a side elevational view of a portion of a gage arrangement for measuring the angle between the adjacent surfaces of the roll formed part that constitute the flange and the adjacent wall of the refrigerator cabinet after fabrication is completed;

DESCRIPTION OF THE PERFERRED EMBODIMENT

Figure 2:
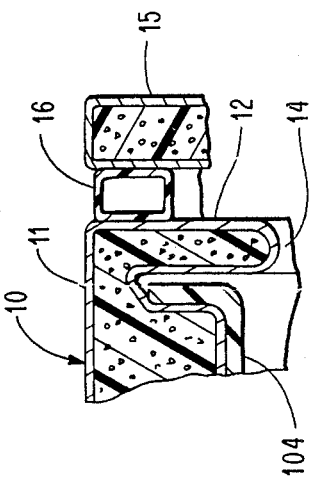
FIG. 2 is an enlarged fragmentary sectional view of a portion of a refrigerator cabinet including a flange that is to have its angle with respect to an adjacent wall of the refrigerator cabinet controlled and against which a door gasket seals.

Referring to the drawings and particularly FIG. 2, there is shown a portion of a refrigerator cabinet 10 including a top wall 11 having a front flange 12 extending downwardly therefrom and substantially perpendicular thereto. The front flange 12 surrounds an opening 14, which provides access to the interior of the refrigerator cabinet 10, around both the top and sides of the refrigerator cabinet 10.

A door 15 is pivotally mounted on the refrigerator cabinet 10 for closing the opening 14. The door 15 includes a perpiheral gasket 16 for cooperating with the front flange 12 to form a seal therebetween. If the front flange 12 is not substantially perpendicular to the top wall 11 of therefrigerator cabinet 10, an effective seal will not occur between the gasket 16 and the front flange 12.

The refrigerator cabinet 10 is formed from a prepainted metal such as steel, for example. The front flange 12 of the refrigerator cabinet 10 is bent relative to the top wall 11 in a roll forming machine 17 (see FIG. 1), which receives a flat sheet 18 of metal.

The roll forming machine 17 includes a plurality of longitudinally spaced sets (thirty-two, for example) of powered rollers through which the sheet 18 of metal is progressively advanced. As the sheet 18 of metal is progressively advanced through the roll forming machine 17, the sets of rollers in the roll forming machine 17 progressively bend the sheet 18 of metal so that the front flange 12 (see FIG. 2) of the refrigerator cabinet 10 is substantially perpendicular to the top wall 11 when the sheet 18 (see FIF. 1) of metal exits from the roll forming machine 17 as a roll formed part 20, which is fabricated to form a portion of the refrigerator cabinet 10.

The roll formed part 20 exits from the roll forming machine 17 onto a conveyor 21, which has powered rollers to convey the roll formed part 20 to a queue station 22. The queue station 22 has a plurality of the roll formed parts 20 stored therein at the start of each work shift; these are not used as long as the roll forming machine 17 if functioning.

Thus, the last roll formed part 20 is advanced by the conveyor 21 to a conveyor 23, which has powered rollers, at the queue station 22. The roll formed part 20 is advanced from the conveyor 23 to a conveyor 24, which has powered rollers to convey the last roll formed part 20 to a toe bend gage station 25. When the roll formed part 20 is at the toe bend gage station 25, the angular relation is measured between a surface 26, which will become the top wall 11 (see FIG. 2), of the roll formed part 20 (see FIG. 1) and a surface 27, which will become the front flange 12 (see FIG. 2) of the refrigerator cabinet 10, of the roll formed part 20 (see FIG. 1) to determine if the angle therebetween is within a predetermined angular range. For example, the predetermined angular range could be between 89° to 91°, for example. The same angular tolerance exists on each side of 90°, that is, 1° greater or smaller than 90°, for example.

Two linear variable differential transformers (LVDTs) 28 and 29 engage the surface 26 of the roll formed part 20 at the mid-point of its length. Two additional LVDTs 30 and 31 engage the surface 27 of the roll formed part 20 at the mid-point of its length. One suitable example of the LVDTs 28-31 is an LVDT sold by Sangamo Transducers, Grand Island, New York as model AG5.

Figure 4:
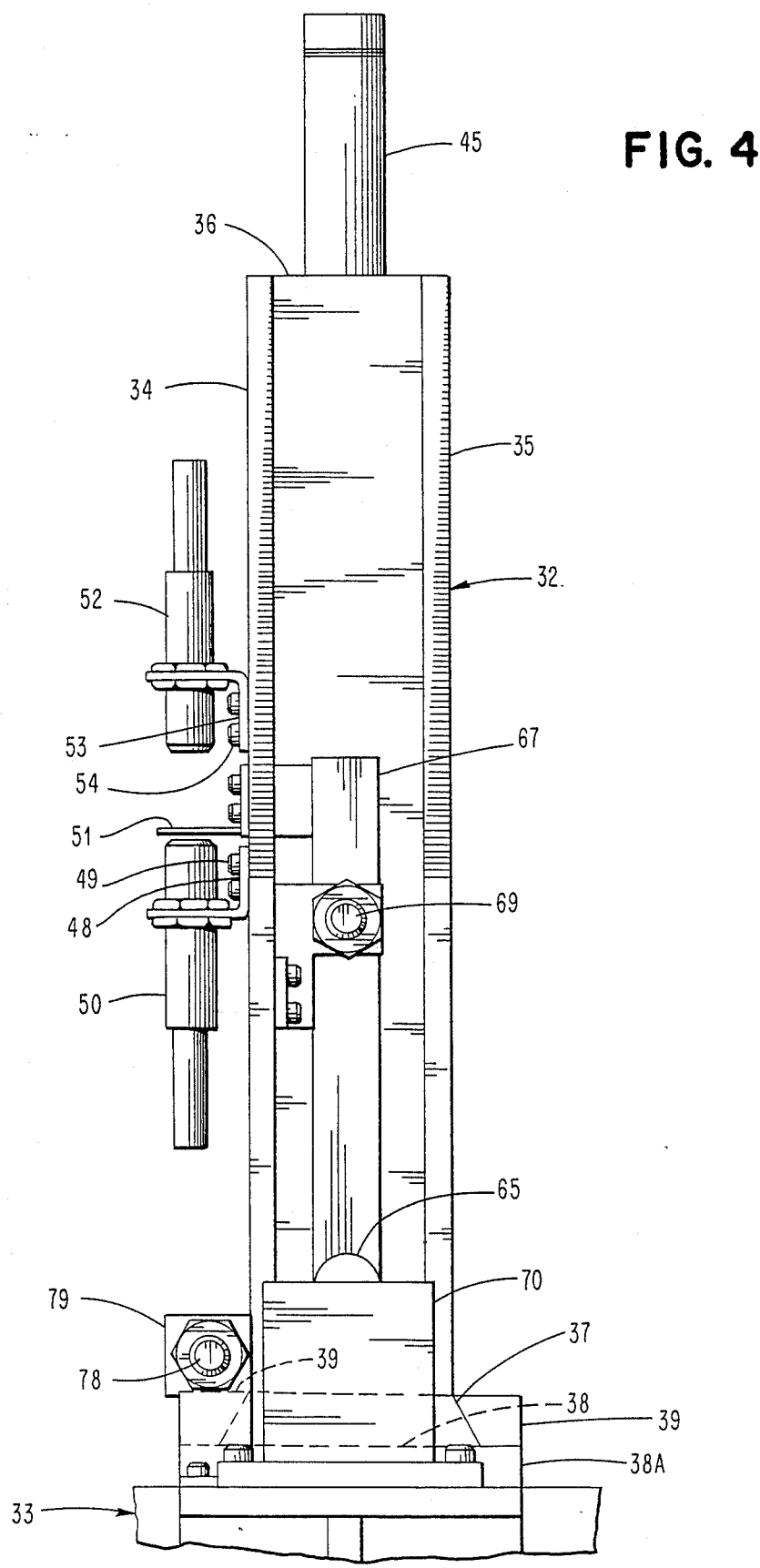
FIG. 4 is a fragmentary end elevational view of the gage arrangement of FIG. 3.

The LVDTs 28-31 are supported on an upper base assembly 32 (see FIG. 3A), which is slidably supported on a fixed lower base assembly 33. The upper base assembly 32 includes a pair of side plates 34 and 35 (see FIG. 4) spaced from each other and attached to each other by an end plate 36 secured to one end of each of the side plates 34 and 35. Each of the side plates 34 and 35 has its bottom attached by screws to a sliding plate 37. The sliding plate 37 slides along a horizontal surface 38 of a wear plate 38A, which is attached by screws to the lower base assembly 33. As shown in FIG. 4, the sliding plate 37 and a pair of V-shaped gibs 39, which are attached by screws to the wear plate 38A, have cooperating inclined surfaces.

The LVDTs 28 (see FIG. 3A) and 29 are adjustably mounted in a mounting block 40 and retained in their adjusted positions therein by set screws (not shown). The mounting block 40 is connected to a lower portion of a support plate 41, which also has a mounting block 42 connected thereto at its upper portion.

The mounting block 42 is connected to a threaded end of a rod 43 coupled to a piston rod 44 of an air cylinder 45, which is supported by a bracket 46 on the end plate 36 of the upper base assembly 32, by a coupling 47. One suitable example of the coupling 47 is a self aligning piston rod coupling sold by PHD Inc., Fort Wayne, Indiana as model No. 312. Accordingly, reciprocation of the rod 43 through controlling supply of pressurized air to the air cylinder 45 causes movement of the LVDTs 28 and 29 toward and away from the surface 26 of the roll formed part 20.

An L-shaped switch bracket 48 is attached by screws 49 to the end plate 36 of the upper base assembly 32. The bracket 48 supports a first proximity sensor switch 50 to sense the presence of a sensor plate 51 when the LVDTs 28 and 29 have been advanced to the desired position relative to the surface 26 of the roll formed part 20. One suitable example of the proximity sensor switch 50 is sold by General Electric as modet No. CR215DB18SA2NB.

The sensing plate 51 is mounted on the mounting block 42 for movement therewith when the piston rod 44 is extended towards or away from the air cylinder 45. In FIG. 3A, the sensing plate 51 is in the position in which its presence is sensed by the switch 50 to stop advancement of the LVDTs 28 and 29.

A second proximity sensor switch 52 is supported by an L-shaped bracket 53, which is fixed to the end plate 36 of the upper base assembly 32 by screws 54. The switch 52 determines when the motion of the LVDTs 28 and 29 away from the surface 26 of the roll formed part 20 is stopped during upward motion of the piston rod 44.

The support plate 41 has a pair of V-shaped gibs 55 (one shown), which are slidably mounted on a slide 56 for vertical sliding motion relative thereto, attached thereto. The slide 56 is fixed by screws to the end plate 36 of the upper base assembly 32. The V-shaped gibs 55 and the slide 56 have cooperating inclined surfaces in the same manner as shown in FIG. 4 for the sliding plate 37 and the V-shaped gibs 39.

The LVDTs 30 (see FIG. 3A) and 31 are similarly adjustably mounted in a mounting block 57, which is connected to one portion of a support plate 58. The support plate 58 has its opposite portion connected to a mounting block 59. The support plate 58 has a pair of V-shaped gibs 60 (one shown), which are slidably supported on a slide 61, attached thereto. The slide 61 is fixedly secured to the sliding plate 37 of the upper base assembly 32. The V-shaped gibs 60 and the slide 61 have cooperating inclined surfaces in the same manner as shown in FIG. 4 for the sliding plate 37 and the V-shaped gibs 39.

The mounting block 59 (see FIG. 3A) is connected to a threaded end of a rod 62, which is secured to a coupling 63. The coupling 63, which is the same as the coupling 47, is attached to a piston rod 64 of an ire cylinder 65, which is supported on the side plate 34 of the upper base assembly 32.

A sensing plate 67 is attached to the mounting block 59 for movement therewith as the piston rod 64 of the air cylinder 65 is extended and retracted relative to the air cylinder 65. The sensing plate 67 cooperates with a proximity sensor switch 68, which is supported on the side plate 34 of the upper base assembly 32 and is the same as the switch 50, when the LVDTs 30 and 31 are disposed at the desired position relative to the surface 27 of the roll formed part 20 to stop extension of the piston rod 64 from the air cylinder 65. Retraction of the piston rod 64 into the air cylinder 65 is stopped when the sensing plate 67 is adjacent a proximity sensor switch 69, which also is mounted on the side plate 34 of the upper base assembly 32 and is the same as the switch 50.

The upper base assembly 32 is moved towards and away from the roll formed part 20 by an air cylinder 70 (see FIG. 3B), which is supported on the lower base assembly 33. The air cylinder 70 has a piston rod 71 extending therefrom and connected through a coupling 72 to a rod 73. One suitable example of the coupling 72 is a self aligning piston rod coupling sold by PHD Inc., Fort Wayne, Indiana as model No. 437.

The rod 73 has a threaded end connected to a spacer 74, which is fixed to the sliding plate 37. Thus, extension of the piston rod 71 from the air cylinder 70 moves the upper base assembly 32 to the position of FIG. 3A.

The spacer 74 (see FIG. 3B) has a sensing plate 75 mounted thereon for cooperation with a proximity sensor switch 76, which is the same as the switch 50 (see FIG. 3A), mounted on the lower base assembly 33 by a bracket 77. The sensing plate 75 (see FIG. 3B) cooperates with the switch 76 when the piston rod 71 is extended from the air cylinder 70 to stop extension of the piston rod 71. The sensing plate 75 cooperates with a proximity sensor switch 78, which is the same as the switch 50 (see FIG. 3A) and mounted on the lower base assembly 33 (see FIG. 3B) by an L-shaped bracket 79, when the piston rod 71 is retracted into the air cylinder 70 to stop retraction of the piston rod 71. Thus, precise positioning of the upper base assembly 32 by the air cylinder 70 is obtained.

In operation, the air cylinder 70 is initially activated to extend the piston rod 71 so that the upper base assembly 32 is in the position of FIGS. 3A and 3B. After the sensor switch 76 (see FIG. 3B) has stopped extension of the piston rod 71 from the air cyclinder 70, the air cylinder 65 has the piston rod 64 (see FIG. 3A) extended therefrom to move the LVDTs 30 and 31 towards the surface 27 of the roll formed part 20. After the sensor switch 68 has stopped extension of the piston rod 64 from the air cylinder 65, the air cylinder 45 has the piston rod 44 extended therefrom to position the LVDTs 28 and 29 adjacent the surface 26 of the roll formed part 20. The activation of the sensor switch 50 stops extension of the piston rod 44 from the air cylinder 45 so that gaging by the LVDTs 28-31 can occur.

When the LVDTs 28-31 are properly positioned and it is desired to measure the angle between the surfaces 26 and 27 of the roll formed part 20, each of the LVDTs 28-31 will produce a voltage in a range of +5 volts to −5 volts. When gaging is to occur, voltages are supplied from the LVDTs 28-31 through a multiplexer (MPX) 80 (see FIG. 1) to an IBM personal computer (PC) 81, model 5331.

The PC 81 includes one industrial computer color display, IBM model No. 5532; two memory expansion options, IBM part No. 1013; four 64KB memory modules, IBM part No. 1003; one IBM graphics adapter card, IBM part No. 4910; on 10 MB hard disk drive, IBM part No. 6017; one asynchronous adapter card, RS232, IBM part No. 2074; and one industrial graphics printer, IBM part No. 5533.

The MPX 80 includes a Sangamo System 16 transducer/computer interface sold by Sangamo Transducers, Grand Island, New York and an RS 232 interface for the Sangamo System 16. Only five of the sixteen interfaces of the Sangamo System 16 are used.

The PC 81 has software therein to control the gaging and other operations. The PC 81 includes software as represented by the flow charts of FIGS. 9-13.

The PC 81 (see FIG. 1) includes statistical analysis software to analyze stored data received from the LVDTs 28-31 and display this information on a monitor 82. The PC 81 is connected to a programmable controller 83, which is sold by General Electric as a Series Six model. The programmable controller 83 includes a communications controller module (CCM) 84, an axis positioning module (APM) 85, a plurality of input modules 86, and a plurality of output modules 87. Each of the modules 84-87 is a card within the programmable controller 83.

One suitable example of the CCM 84 is a communications control module sold by General Electric as model No. IC600CB516B. One suitable example of the APM 85 is an axis positioning module sold by General Electric as model No. IC600BF917A. One suitable example of each of the input modules 86 is sold by General Electric as model No. IC600BF804B. One suitable example of each of the output modules 87 is sold by General Electric as model No. IC600BF904B.

The programmable controller 83 includes a central processing unit (CPU) 88. Each of the CCM 84 and the APM 85 have access to various registers in the CPU 88.

One of the registers in the CPU 88 is a gage status register. The CCM 84 allows the gage status register to be read and updated by the PC 81.

Another register in the CPU 88 is an adjustment register. This adjustment register contains the number of steps that the APM 85 should move an adjustment motor 89, which is a stepper motor. The CCM 84 allows the PC 81 to update this adjustment register with the next adjustment to be performed.

The programmable controller 83 controls the movement of each of the piston rods 44 (see FIG. 3A), 64, and 71 (see FIG. 3B) so that the LVDTs 28–31 (see FIG. 3A) are properly positioned relative to the part 20 when the part 20 is to be gaged. The programmable controller 83 (see FIG. 1) receives signals when each of the sensor switches 50 (see FIG. 3A), 52, 68, 69, 76, and 78 (see FIG. 3B) is activated. After the sensor switch 50 (see FIG. 3A) has been activated by the sensing plate 51 so that the LVDTs 28–31 are properly disposed relative to the part 20, the programmable controller 83 (see FIG. 1) sets a bit in its gage status register in the CPU 88. Then, the PC 81 detects this bit in the gage status register in the CPU 88 via the CCM 84 whereby the PC 81 reads the magnitudes of the voltages from the LVDTs 28–31.

The data obtained from the LVDTs 28–31 are used by the PC 81 to calculate the flange angle between the surfaces 26 and 27 of the part 20. The flange angle is corrected, subject to calibration, and stored in files in the PC 81 for statistical analysis. The PC 81 monitors the flange angle over time; if a selected number of successive measurements are outside the control limits, an adjustment necessary to return the flange angle within the control limits is calculated by the software of the PC 81 and sent to the APM 85 via the CCM 84 and the CPU 88.

The CPU 88 of the programmable controller 83 has an operating program that determines when a new adjustment is transferred by the CCM 84. The CPU 88 then transfers the new adjustment to the APM 85 which controls the actual adjustment.

Transfer of the adjustment to the APM 85 causes a motor controller 90 to move the motor 89 a desired distance in a desired direction. This motion of the motor 89 causes movement of a powered roller 92 (see FIG. 7) of a last set 93 of powered rollers of the roll forming machine 17 (see FIG. 1) relative to the surface 27 (see FIG. 7) of the roll formed part 20. One suitable example of the stepper motor 89 (see FIG. 1) is a stepper motor sold as model M112FJ326 by Superior Electric Company, Bristol, Connecticut. One suitable example of the motor controller 90 is a motor controller sold as model BUF105-1230 by Superior Electric Company, Bristol, Connecticut.

Figure 7:
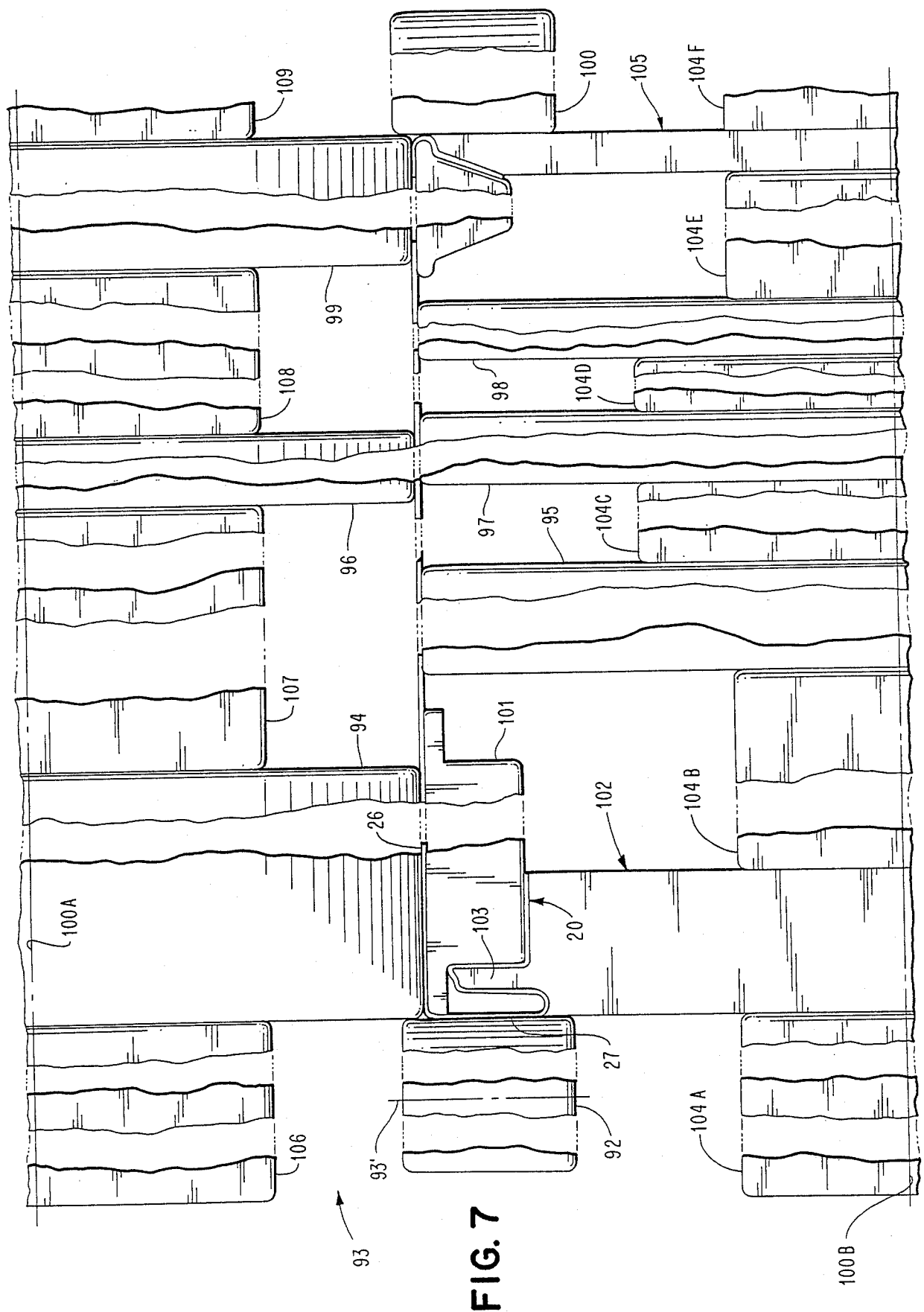
FIG. 7 is a fragmentary end elevational view of the last set of rollers of the roll forming machine of the system of the present invention.

The roller 92 (see FIG. 7) is moved towards or away from the surface 27 of the roll formed part 20 in a horizontal direction, as viewed in FIG. 7, in accordance with the adjustment sent to the APM 85 (see FIG. 1) by the PC 81. The roller 92 (see FIG. 7) rotates about a vertical axis 93', which is the centerline of a rotatable shaft (not shown) on which the roller 92 is mounted.

The last set 93 of powered rollers also includes powered rollers 94, 95, 96, 97, 98, 99, and 100. Each of the rollers 94, 96, and 99 rotates about a horizontal axis 100A, which is the centerline of a rotatable shaft (not shown) on which the rollers 94, 96, and 99 are mounted, and each of the rollers 95, 97, and 98 rotates about a horizontal axis 100B, which is the centerline of a rotatable shaft (not shown) on which the rollers 95, 97, and 98 are mounted. The roller 100 rotates about a vertical axis, which is the centerline of a rotatable shaft (not shown) on which the roller 100 is mounted.

The last set 93 of powered rollers also has a metal insert 101 cooperating with the rollers 92 and 94 to form the 90° corner between the surfaces 26 and 27 of the roll formed part 20. The insert 101 enables the surface 27 to be pivoted thereabout by the roller 92 bearing thereagainst.

The last set 93 of powered rollers also includes a metal insert 102 having a finger 103 projecting into the roll formed part 20 to provide a groove into which a plastic liner 104 (see FIG. 2) of the refrigerator cabinet 10 is disposed when the roll formed part 20 (see FIG. 7) has been fabricated into the refrigerator cabinet 10 (see FIG. 2).

The last set 93 (see FIG. 7) of powered rollers has spacers 104A and 104B on opposite sides of the insert 102. A spacer 104C is positioned between the rollers 95 and 97, and a spacer 104D is disposed between the rollers 97 and 98. Spacers 104E and 104F are located on opposite sides of an insert 105. Spacers 106 and 107 are on opposite sides of the roller 94. A spacer 108 is positioned between the rollers 96 and 99. A spacer 109 is located next to the roller 99.

Figure 5:
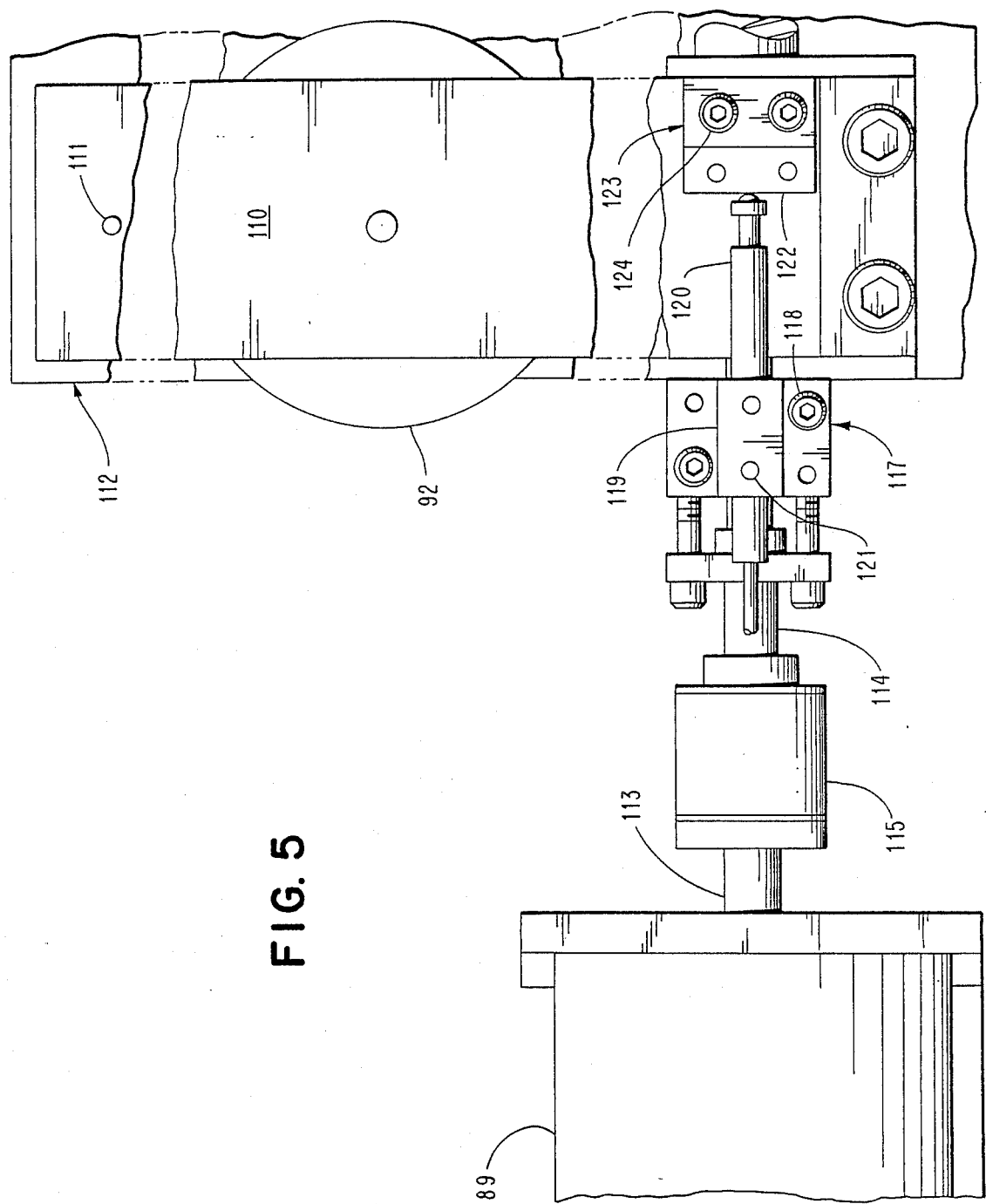
FIG. 5 is a top plan view of an arrangement for adjusting a roller of the last set of rollers of a roll forming machine.
Figure 6:
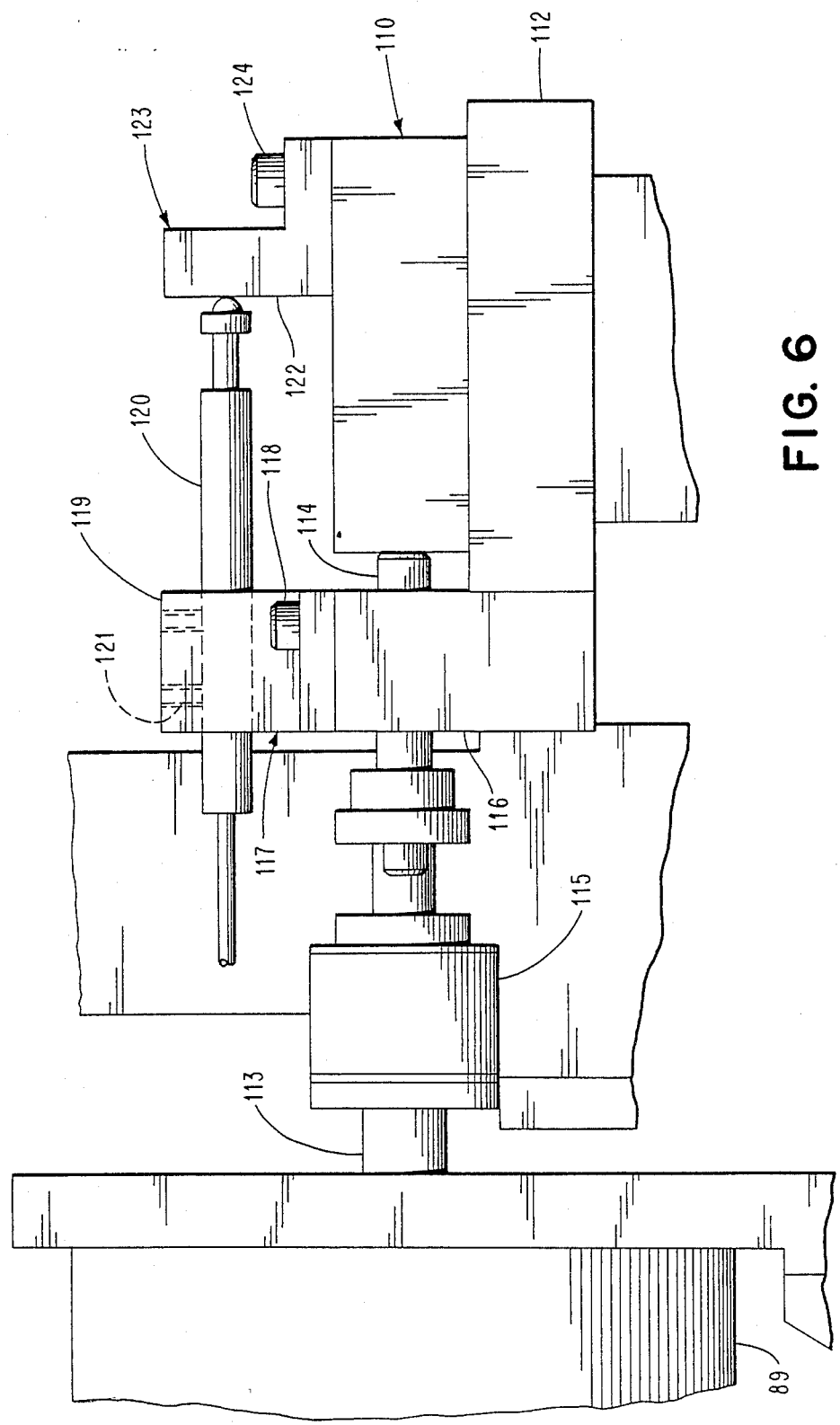
FIG. 6 is a side elevational view of a portion of the arrangement of FIG. 5 for adjusting a roller of the last set of rollers of the roll forming machine.

As shown in FIG. 5, the roller 92 is rotatably supported on a roller arm 110, which is mounted for pivoting about a pivot pin 111 on a fixed support block 112 (see FIG. 6). The motor 89 (see FIG. 5) has its shaft 113 connected to a screw 114 through a coupling 115. One suitable example of the coupling 115 is a coupling sold by Servometer Corp., Cedar Grove, New Jersey, as part number ST-100.

The screw 114 is secured to the roller arm 110 so that rotation of the motor 89 in one direction causes the roller arm 110 to pivot clockwise about the pivot pin 111 while rotation of the motor shaft 113 in the opposite direction causes counterclockwise pivoting of the roller arm 110 about the pivot pin 111. Thus, the roller 92 is moved closer or further away from the surface 27 (see FIG. 7) of the part 20 during horizontal motion of the roller 92.

As shown in FIG. 7, the motion of the roller 92 towards the surface 27 of the roll formed part 20 is limited by the roller 94. If desired, this interference can be avoided through forming the roller 92 so that it does not extend to an interfering position with the roller 94 or by undercutting the portion of the roller 92 that is prevented from movement to the right in FIG. 7 by the roller 94. This would be only a slight undercut since there is only a slight amount of tolerance (1°–1.5°, for example) less than 90° between the surfaces 26 and 27 of the roll formed part 20.

The fixed support block 112 (see FIG. 6) has a vertical support block 116 attached to one side and extending higher than the fixed support block 112 to substantially the same height as the roller arm 110. The vertical support block 116 has the screw 114 extend therethrough for connection to the roller arm 110.

A bracket 117 is connected to the vertical support block 116 by screws 118. The bracket 117 has a central upstanding portion 119 in which an LVDT 120, which is the same as the LVDTs 28 (see FIG. 1)-31, is adjustably positioned. The LVDT 120 (see FIG. 6) is retained in its adjusted position within the central upstanding portion 119 of the bracket 117 by set screws 121.

The LVDT 120 has its plunger riding along a surface 122 of an L-shaped bracket 123. The L-shaped bracket 123 is connected to the upper surface of the roller arm 110 by screws 124.

Figure 11:
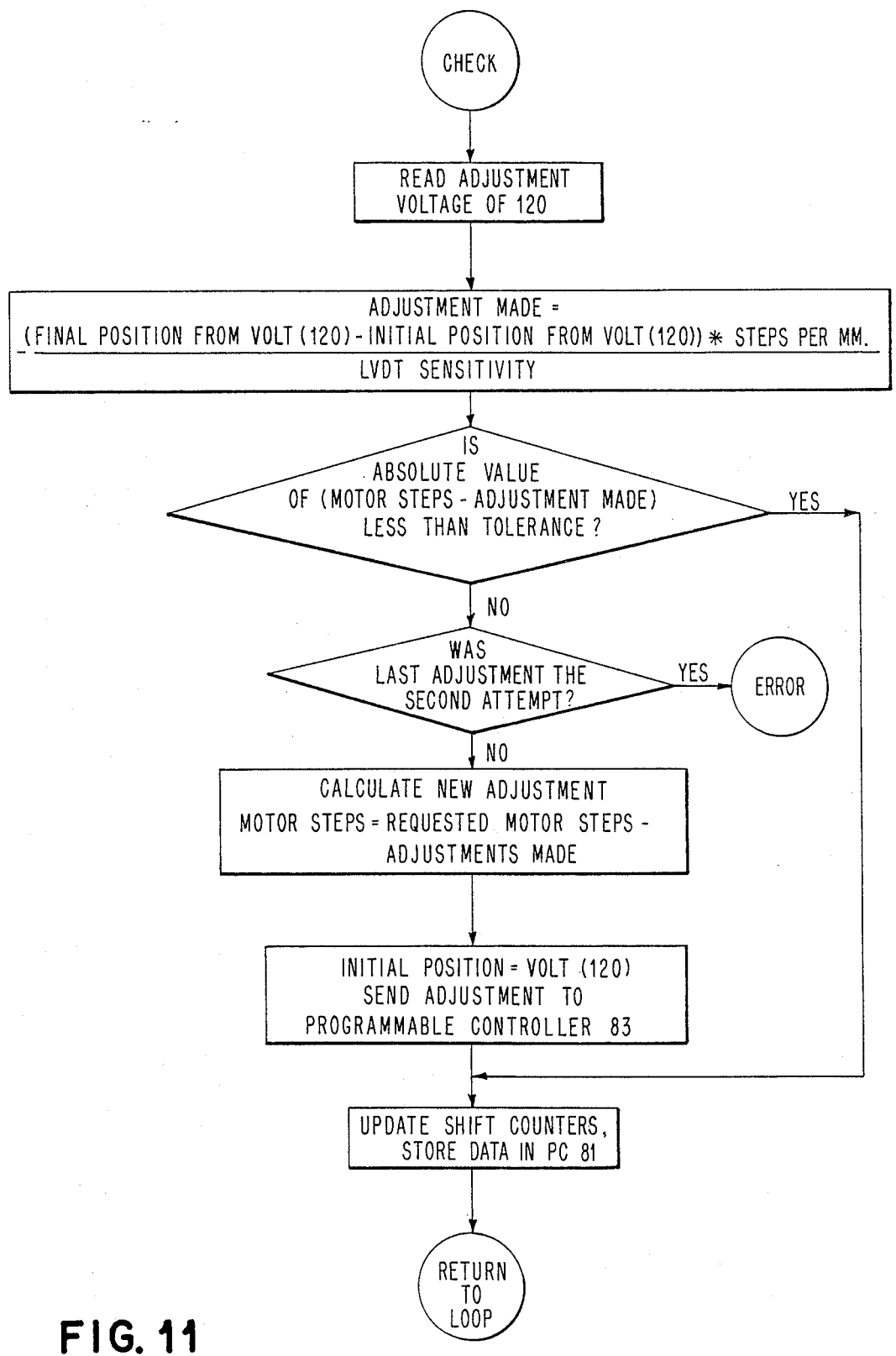
FIG. 11 is a flow chart of software utilized in the IBM PC for determining if the adjustment of the roller of the last set of rollers of the roll forming machine is satisfactory.

The voltage output of the LVDT 120 is transmitted through the MPX 80 (see FIG. 1) to the PC 81 prior to adjustment of the roller arm 110 (see FIG. 5) about the pivot pin 111 to shift the position of the roller 92. After pivoting of the roller arm 110 is completed, the voltage output of the LVDT 120 for the final position of the roller arm 110 is transmitted through the MPX 80 (see FIG. 1) to the PC 81. Then, a determination is made by the software of the PC 81 as shown by the flow chart of FIG. 11 to ascertain if the adjustment of the roller arm 110 (see FIG. 5) has positioned the roller 92 within the desired tolerance. If not, then a further correction is made as shown by FIG. 11.

Figure 8:
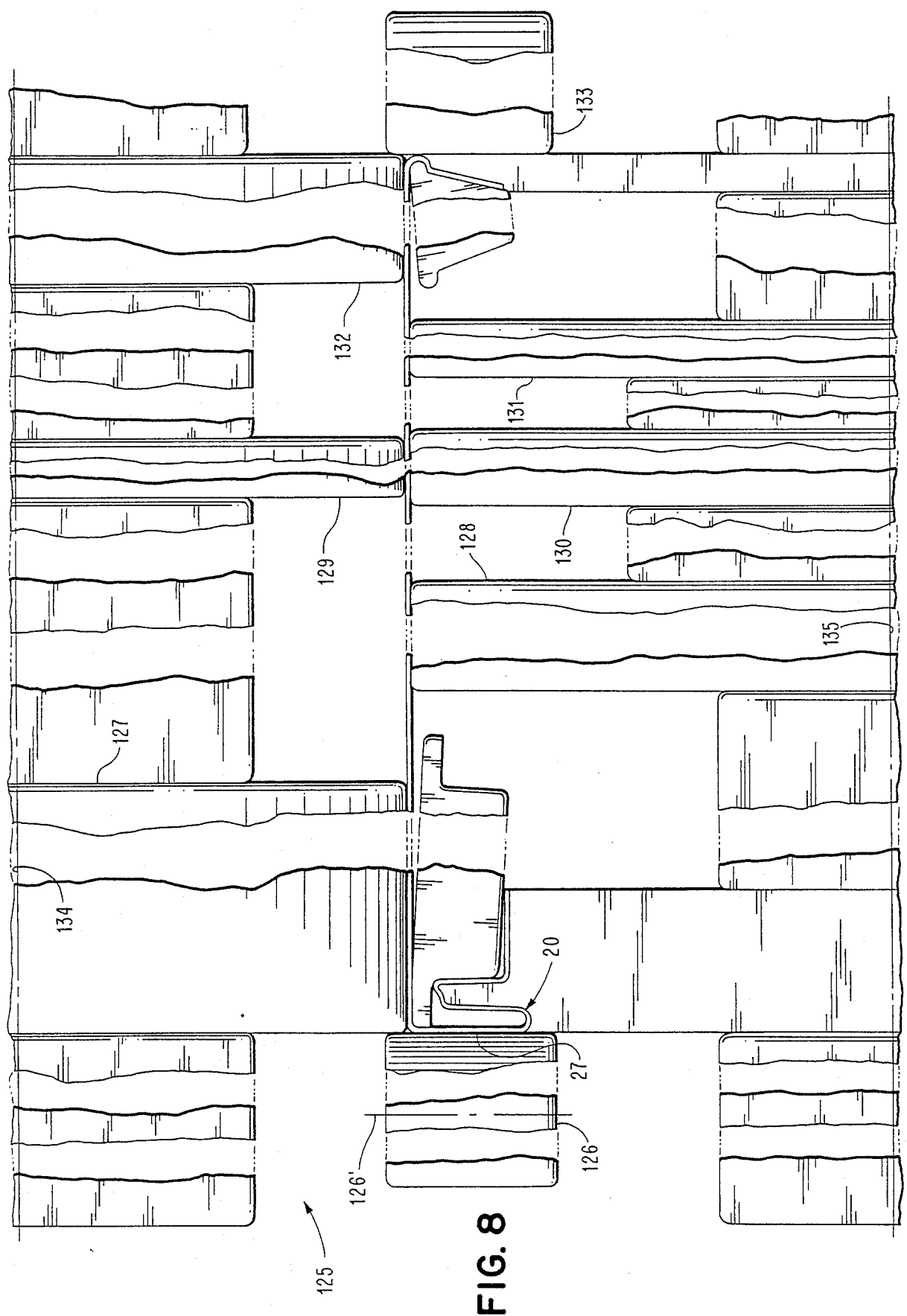
FIG. 8 is a fragmentary end elevational view of a set of rollers of the roll forming machine adjacent the last set of rollers of FIG. 7.

The roll forming machine 17 (see FIG. 1) has a set 125 (see FIG. 8) of powered rollers next to the last set 93 (see FIG. 7) of rollers. As shown in FIG. 8, the set 125 of rollers includes a powered roller 126 engaging the surface 27 of the roll formed part 20 and rotatable about a vertical axis 126', which is the centerline of a rotatable shaft (not shown) on which the roller 126 is mounted.

The set 125 of rollers also includes powered rollers 127, 128, 129, 130, 131, 132, and 133. The rollers 127, 129, and 132 are rotatable about a horizontal axis 134, which is the centerline of a rotatable shaft (not shown) on which the rollers 127, 129, and 132 are mounted, and the rollers 128, 130, and 131 are rotatable about a horizontal axis 135, which is the centerline of a rotatable shaft (not shown) on which the rollers 128, 130, and 131 are mounted. The roller 133 is rotatable about a vertical axis, which is the centerline of a rotatable shaft (not shown) on which the roller 133 is mounted. The set 125 of powered rollers has spacers and inserts in the same manner as described for the set 93 (see FIG. 7) of powered rollers.

The roll forming machine 17 (see FIG. 1) has the remaining thirty sets of powered rollers similarly formed. Thus, the sheet 18 is progressively bent as it is advanced through the roll forming machine 17.

Figure 9:
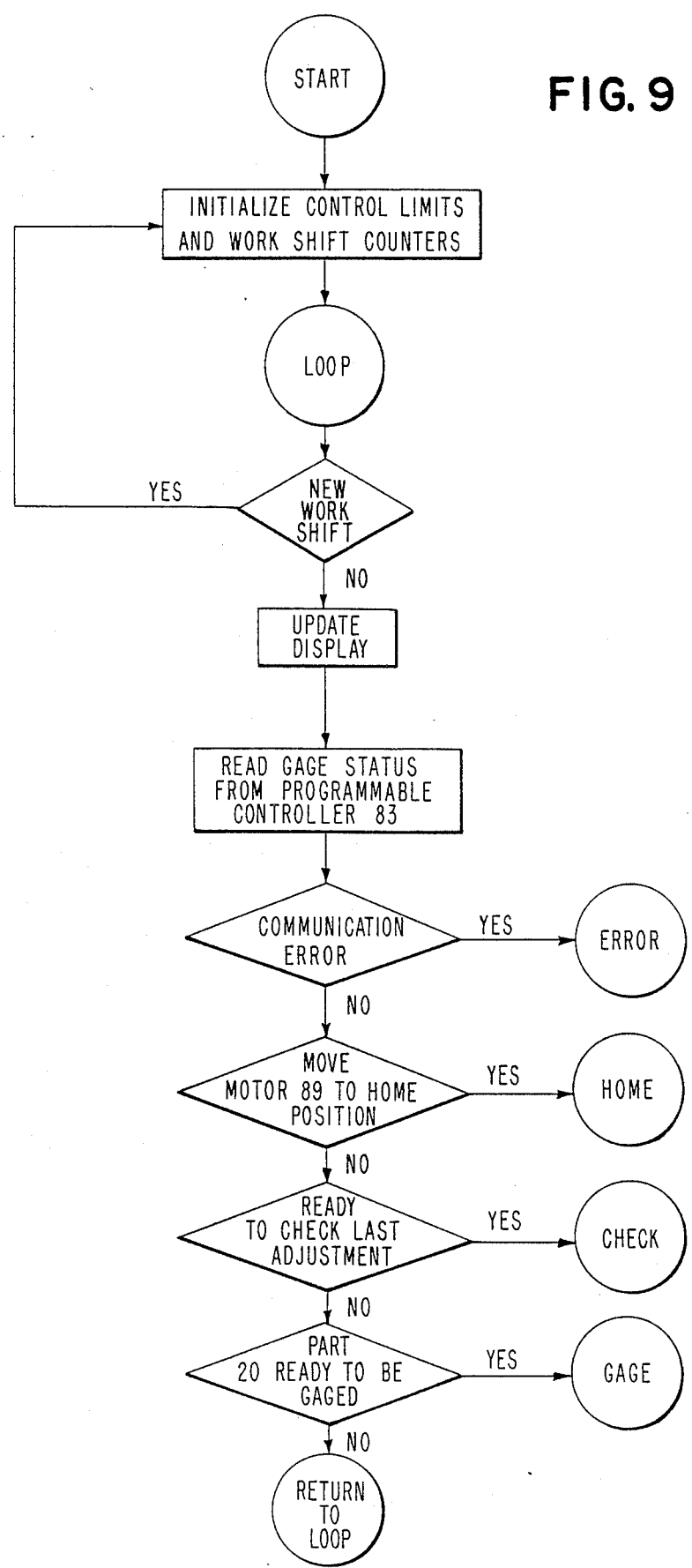
FIG. 9 is a flow chart of software utilized in an IBM personal computer (PC) for ascertaining that the angle between two surfaces of a roll formed part is within a predetermined angular range and for performing adjustments when it is not.

Considering the operation of the present invention and referring to the flow chart of FIG. 9, the start of a cycle causes initialization of control limits and work shift counters as does the start of a new work shift. The work shift counters, which are in the PC 81 (see FIG. 1), count the number of bad and good parts during each work shift. The control limits refer to the tolerance of the measured angle, which can vary from 89° to 91°, for example, when it is desired that there be an angle of 90° between the top wall 11 (see FIG. 2) of the refrigerator cabinet 10 and the front flange 12.

The PC 81 (see FIG. 1) reads the gage status in the gage status register of the programmable controller 83 as indicated in the flow chart of FIG. 9. If there is a communication error in the software of the PC 81 (see FIG. 1), there is a diversion to the ERROR portion of the software; the flow chart of FIG. 13 shows the ERROR portion of the software.

Figure 13:
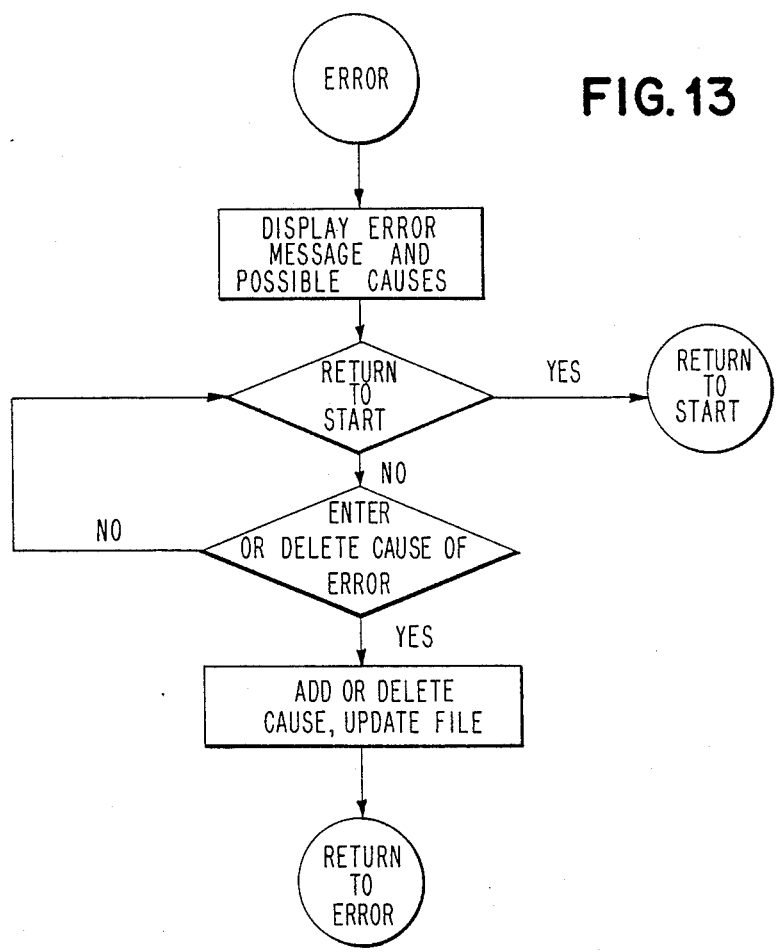
FIG. 13 is a flow chart of software used in the IBM PC for displaying error messages, possible causes of the error, and entering or deleting possible causes.

If there is an error, the error and its possible causes are displayed on the monitor 82 (see FIG. 1) of the PC 81 as shown in the flow chart of FIG. 13. The entering and deletion by the operator of causes of error also are disclosed in FIG. 13.

If there is no communication error, then it will be determined, as shown in FIG. 9, if an operator has requested that the motor 89 (see FIG. 1) be moved to its home position. This request is accomplished by manual actuation of a push button by an operator. This occurs when the position of the motor 89 is not known and it is desired to ascertain the position of the motor 89. When the operator manually activates the push button, the programmable controller 83 has a bit in its gage status register changed to indicate this.

Figure 12:
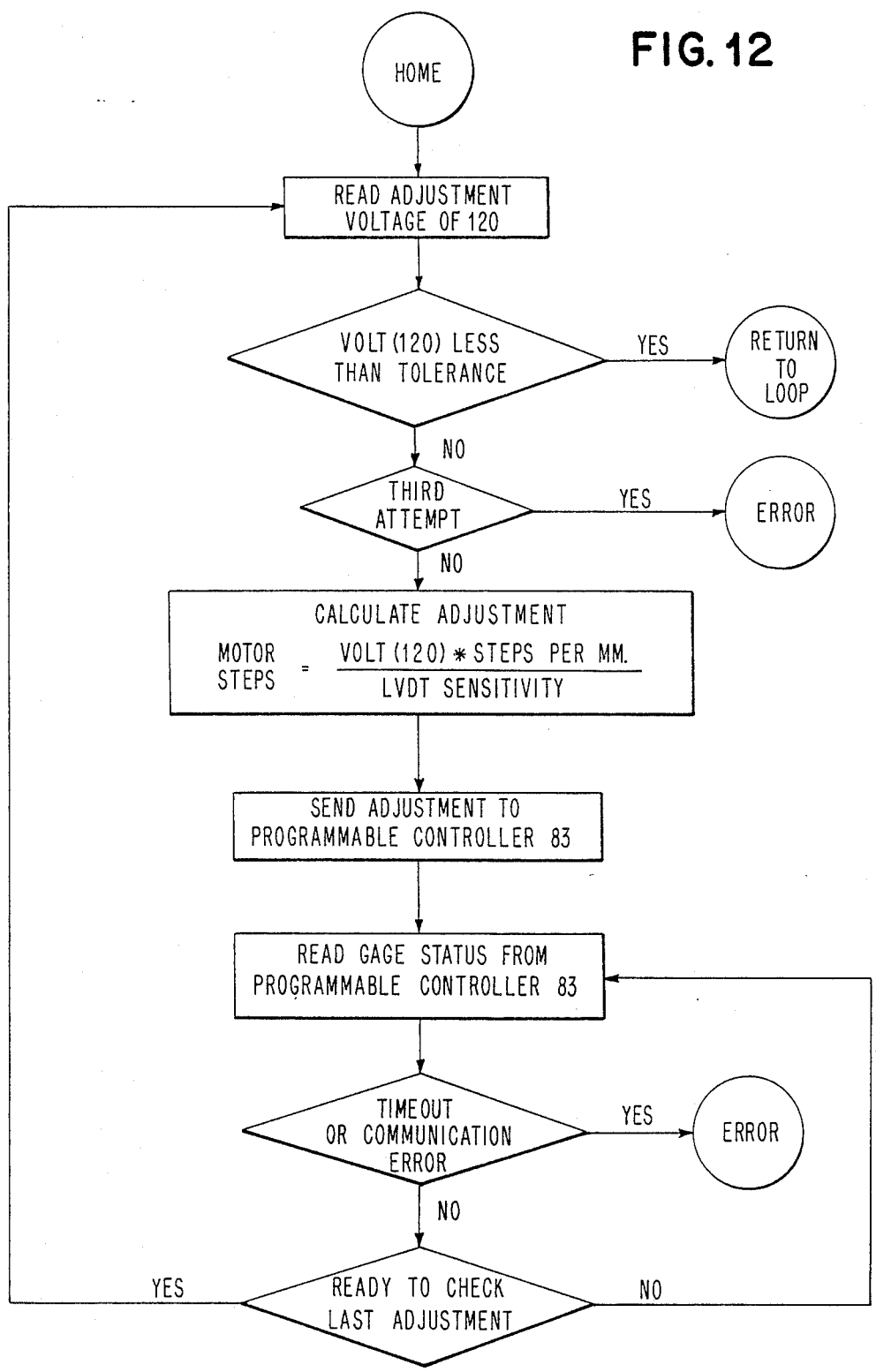
FIG. 12 is a flow chart of software used in the IBM PC for positioning a roller adjustment motor at its home position when an operator so desires.

If the motor 89 is to be moved to its home position by the actuation of the push button, there is a diversion to the HOME portion of the software; the flow chart of FIG. 12 illustrates the HOME portion of the software. If the motor 89 (see FIG. 1) is not to be moved to its home position, then another bit in the gage status register of the programmable controller 83 is read by the PC 81 to determine if the last adjustment of the roller 92 (see FIG. 5) is ready to be checked. If it is not, then another bit in the gage status register of the programmable controller 83 (see FIG. 1) is read by the PC 81 to determine if the roll formed part 20 is ready to be gaged. This occurs when all three of the piston rods 71 (see FIG. 3B), 64 (see FIG. 3A), and 44 have completed their movements to position the LVDTs 28-31 for gaging the roll formed part 20.

If the roll formed part 20 is not ready to be gaged, then there is a return to LOOP as shown in FIG. 9. However, if the roll formed part 20 (see FIG. 3A) is ready to be gaged, then the GAGE portion of the software, as shown by the flow chart of FIG. 10, in the PC 81 (see FIG. 1) is used to gage the roll formed part 20.

Figure 10:
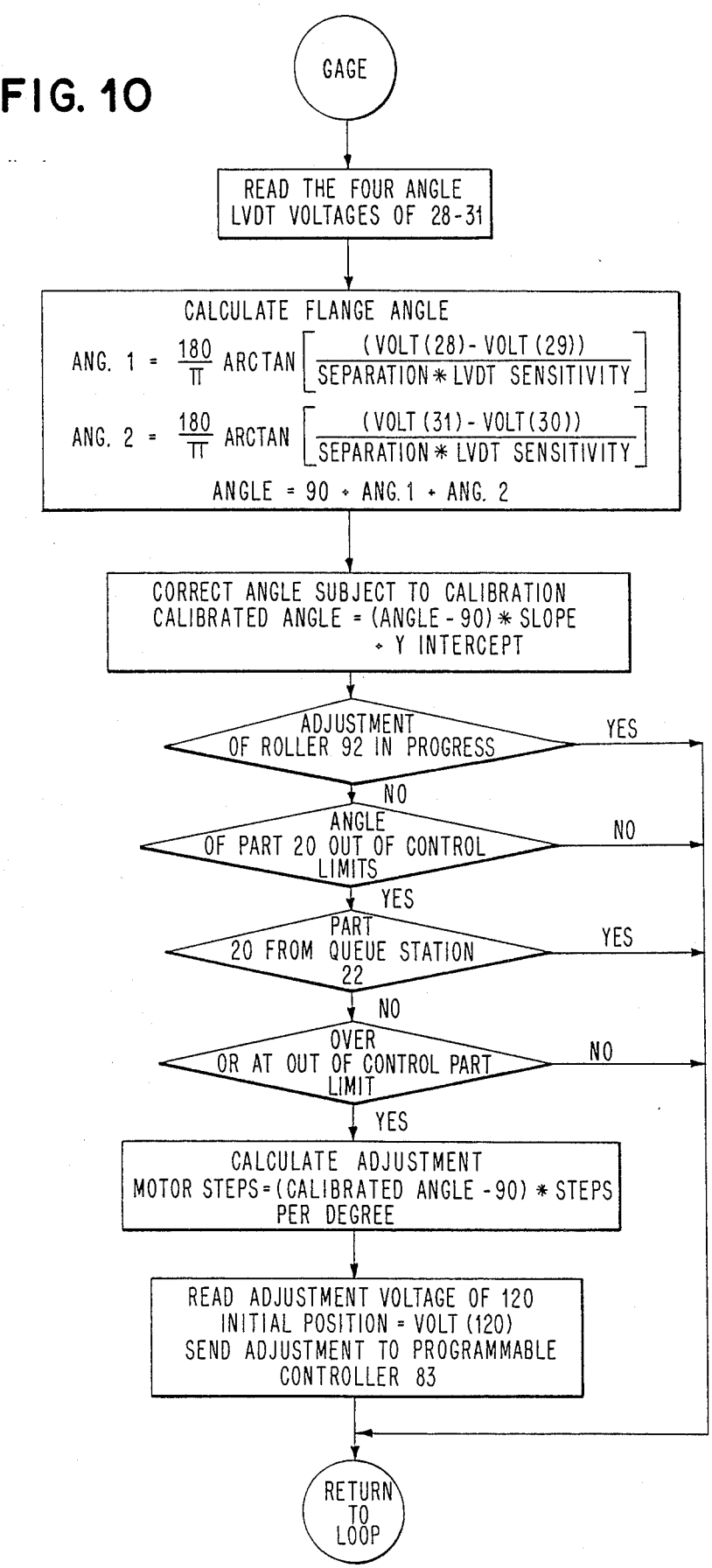
FIG. 10 is a flow chart of software utilized in the IBM PC for adjusting the position of a roller of the last set of rollers of a roll machine when the angle between the two surfaces of the roll formed part is not within a predetermined angular range.

As shown in FIG. 10, the magnitudes of the voltages in the LVDTs 28-31 (see FIG. 1) are read by the PC 81. With this data, the PC 81 calculates the flange angle (the angle between the surfaces 26 and 27 of the roll formed part 20) from equations set forth in FIG. 10.

Figure 14:
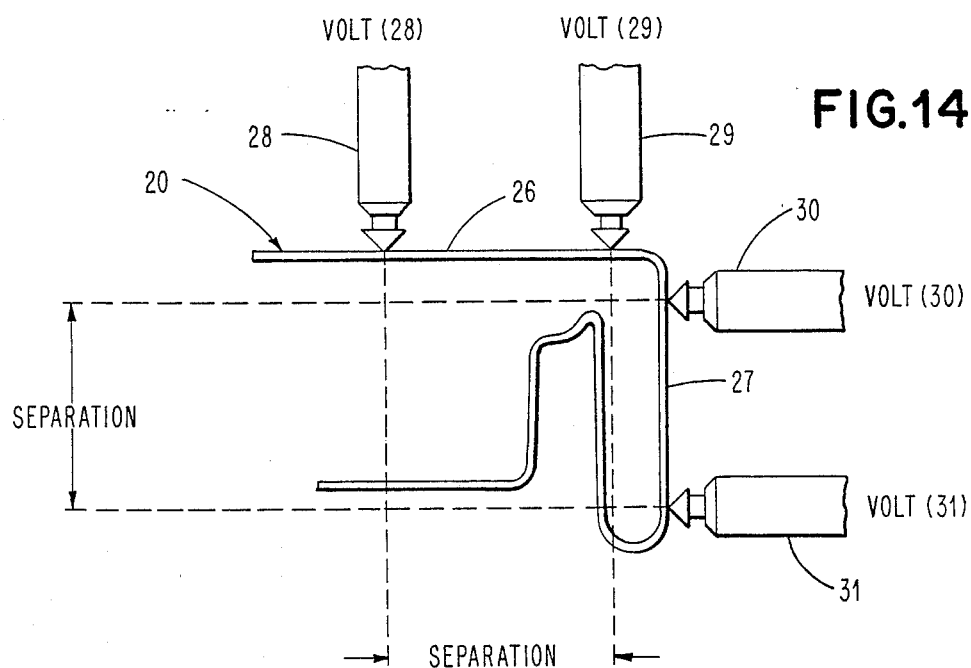
FIG. 14 is a schematic view of how the angle between the two adjacent surfaces of the roll formed part is measured.

As shown in FIG. 14, SEPARATION is the distance in millimeters between the LVDTs 28 and 29 or 30 and 31. Since LVDT SENSITIVITY is in volts/millimeter, the product of SEPARATION and LVDT SENSITIVITY in the equations of FIG. 10 is volts so that the difference in volts between the LVDTs 28 and 29 or 30 and 31 is divided by volts.

When the surface 26 (see FIG. 14) of the roll formed part 20 projects outwardly so that the LVDT 28 has its plunger moved inwardly by this outward projection, the LVDT 28 provides a more positive output in accordance with the amount of motion of its plunger. If the surface 26 of the roll formed part 20 were pushed inwardly so that the LVDT 29 has its plunger moved outwardly, for example, then a more negative voltage is produced from the LVDT 29.

Figure 15:
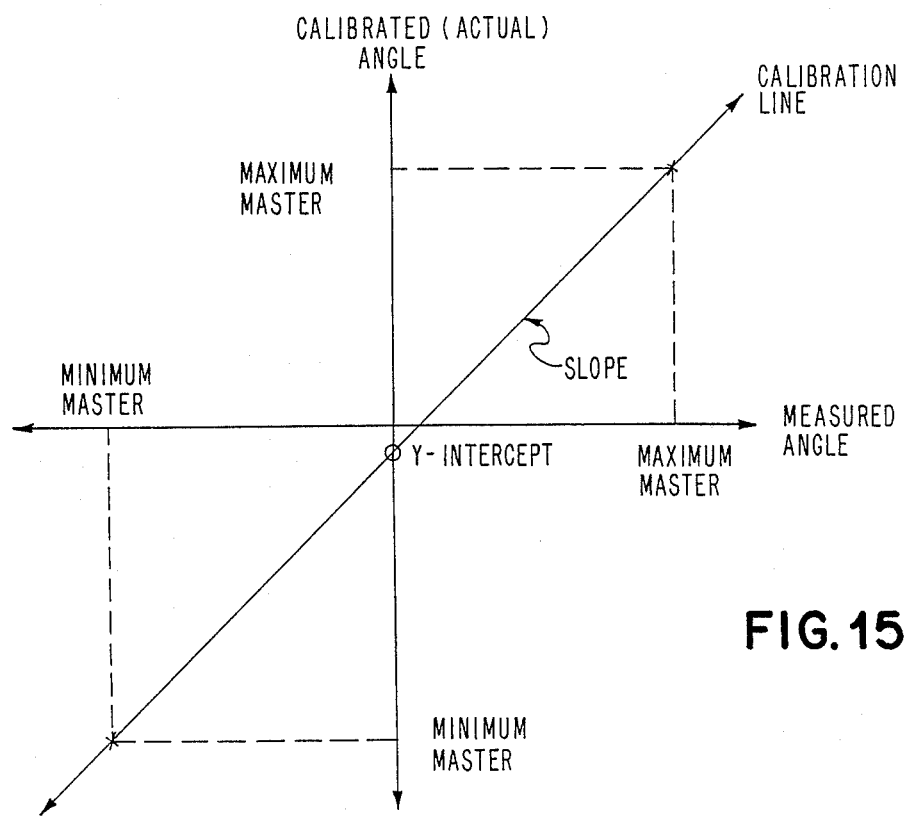
FIG. 15 is a graph showing the relation between the measured angle and the actual angle and used with the flow chart of FIG. 10.

After the calculation of the measured angle in accordance with the equations of FIG. 10, a correction of the measured angle must be made. This correction is made in accordance with the graph of FIG. 15.

If the maximum angle is 91° and the minimum angle is 89°, the maximum master for each of the measured angle and the calibrated angle would be 91° and the minimum for each of the calibrated angle and the measured angle would be 89°. Interception of the measured and calibrated angle axes would be at 90°. By appropriately plotting the measured and calibrated angles with the minimum and maximum masters, a calibration line can be made along with ascertaining its Y intercept.

This is used in the equation of FIG. 10 to obtain the calibrated angle.

If adjustment of the roller 92 (see FIG. 5) is occurring, the PC 81 (see FIG. 1) ceases to use the GAGE portion of the software as shown in FIG. 10, and there is a return to LOOP of FIG. 9. However, if no adjustment of the roller 92 (see FIG. 5) is in progress, the PC 81 (see FIG. 1) determines, as shown in FIG. 10, if the angle between the surfaces 26 (see FIG. 3A) and 27 of the roll formed part 20 is outside of the control limits of 89° and 91°, for example.

If the angle between the surfaces 26 and 27 of the roll formed part 20 is not outside of the control limits, the program returns to LOOP of FIG. 9 as shown in FIG. 10. If the angle between the surfaces 26 (see FIG. 3A) and 27 of the roll formed part 20 is outside the control limits, then the PC 81 (see FIG. 1) determines if the roll formed part 20 is from the queue station 22 as shown in FIG. 10.

If the roll formed part 20 (see FIG. 1) is from the queue station 22, then the program returns to LOOP of FIG. 9 as shown in FIG. 10. This is because any of the roll formed parts 20 (see FIG. 1) at the queue station 22 are not recently formed parts and cannot be used to determine whether the roller 92 (see FIG. 7) needs adjusting.

If the roll formed part 20 is not from the queue station 22 (see FIG. 1), then the PC 81 determines from a shift counter in the PC 81, as shown in FIG. 10, whether the roll formed part 20 (see FIG. 1), which has been determined by the PC 81 to be out-of-control, is the nth successive part gaged out-of-control where n is the out-of-control part limit (a selected number of parts). If it is, then the PC 81 calculates the necessary adjustment by determining the number of steps that the stepper motor 89 is to be moved as shown in FIG. 10. The number of steps of the motor 89 (see FIG. 1) is determined by the product of the number of steps per degree and the difference between the calibrated angle and 90° as shown in FIG. 10. This can be either positive or negative to indicate the direction of rotation of the motor 89 (see FIG. 1).

Figure 1:
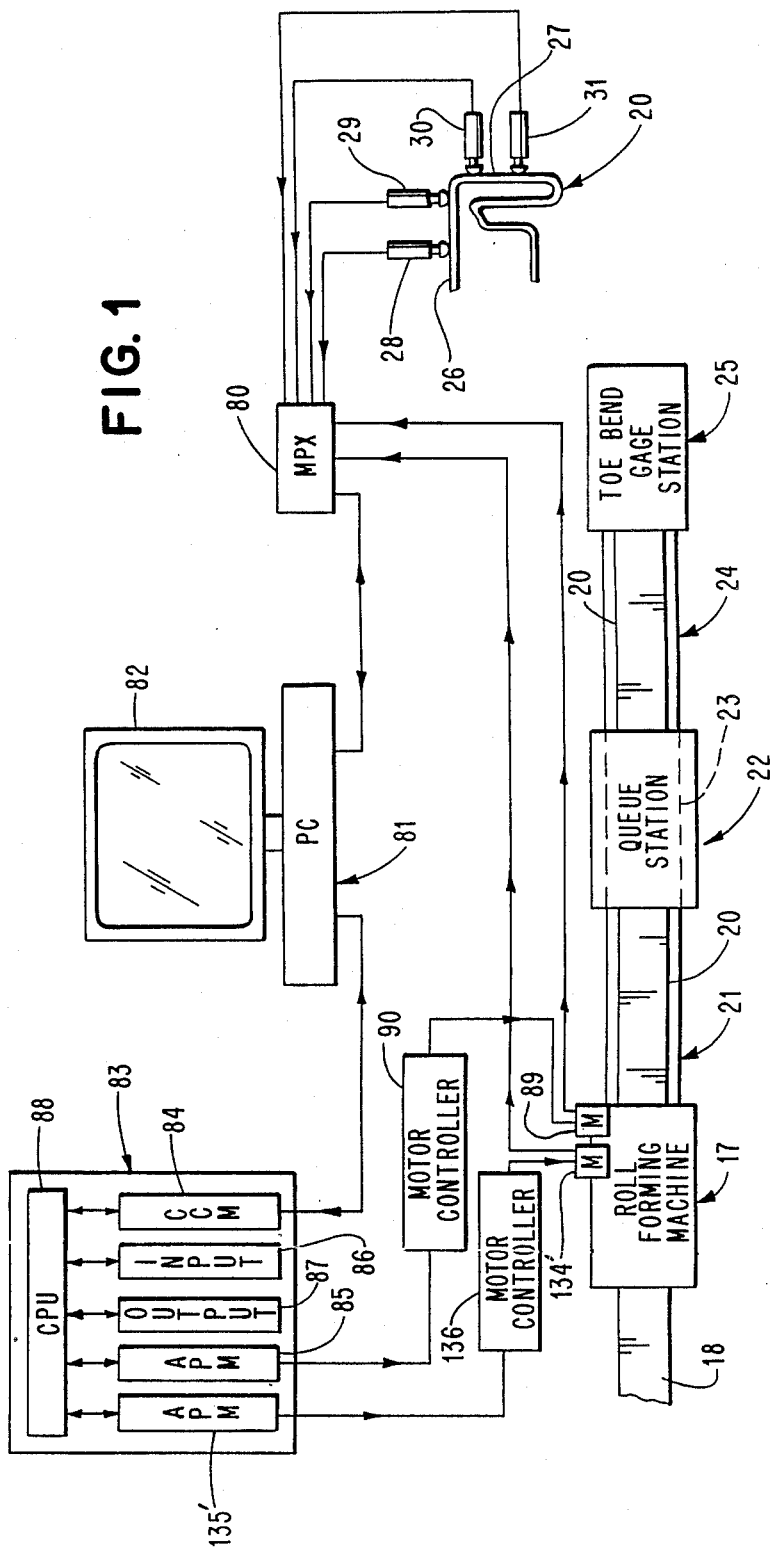
FIG. 1 is a schematic view of a system of the present invention for controlling an angle between two surfaces of a roll formed part.

As shown in FIG. 10, the voltage from the LVDT 120 (see FIG. 5) is read before the adjustment is sent to the programmable controller 83 (see FIG. 1). Then, there is return to LOOP of FIG. 9 so that the software in the PC 81 (see FIG. 1) goes through the steps of FIG. 9 until the bit in the gage status register of the programmable controller 83 (see FIG. 1) is set upon completion of the adjustment of the roller 92 (see FIG. 5) by the motor 89.

The flow chart of FIG. 11 shows the CHECK portion of the software in which it is determined if the final adjustment of the roller 92 (see FIG. 5) by the motor 89 has been accomplished. The final adjustment voltage (This is the voltage from the LVDT 120.) is read by the PC 81 (see FIG. 1).

the PC 81 then determines whether the absolute value between the calculated adjustment and the actual adjustment is less than the tolerance. If it is not, then a determination is made as to whether there has been two adjustments as shown in FIG. 11. If there has been two adjustments, then the ERROR portion of the software, as shown in FIG. 13, causes display of an error.

If the last adjustment was not the second attempt, then the PC 81 (see FIG. 1) calculates a new adjustment as shown in FIG. 11. The magnitude of the voltage of the LVDT 120 (see FIG. 5) at this initial time is read with the adjustment being sent to the programmable controller 83 (see FIG. 1). As shown in FIG. 11, shift counters in the programmable controller 83 (see FIG. 1) are updated, and the data is stored in the PC 81.

While only the roller 92 (see FIG. 7) of the last set 93 of powered rollers has been shown and described as being adjusted, it should be understood that more than one of the rollers of the last set 93 of powered rollers or one or more of the rollers of any of the other longitudinally spaced sets of powered rollers of the roll forming machine 17 (see FIG. 1) could be adjusted. This would require a separate motor such as a motor 134', which is the same as the motor 89, to be controlled for each roller that is to be adjusted. The motor 134' would be connected to an APM 135', which is the same as the APM 85, through a motor controller 136, which is the same as the motor controller 90.

If more than the roller 92 is to be adjusted, the flow chart of FIG. 10 would require a determination of whether adjustment of any of the rollers is in progress. The flow chart of FIG. 11 would be applicable to each of the rollers to be adjusted.

While the flange angle between the surfaces 26 (see FIG. 1) and 27 of the roll formed part 20 has been shown and described as the relation between the surfaces 26 and 27 of the roll formed part 20 that is used to determine when an adjustment is to be made, it should be understood that other relations between the surfaces 26 and 27 of the roll formed part 20 or other surfaces of the roll formed part 20 may be used to determine when an adjustment is to be made. For example, the distance between two substantially parallel surfaces of the roll formed part 20 may be employed for determining when adjustment is to be made. This would require the flow chart of FIG. 10 to have calculation of the distance between the two substantially parallel surfaces of the roll formed part 20 (see FIG. 1) rather than the flange angle between the surfaces 26 and 27 of the roll formed part 20.

An advantage of this invention is that the angle of intersection between two surfaces of a part is obtained without locating the part in a specific plane. Another advantage of this invention is that a roll formed part is produced with a desired angle between two adjacent surfaces. A further advantage of this invention is that compensation is made in a roll forming machine for changes in metallurgical properties and thicknesses of the material being formed by the roll forming machine. Still another advantage of this invention is that compensation is made in a roll forming machine automatically while the machine continues to run whereby a maintenance operator is not required to stop the machine to make a manual adjustment. A still further advantage of this invention is that it insures that a gasket on the door of a refrigerator cabinet will be in sealing engagement with a substantially flat front flange of a refrigerator cabinet against which it engages.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A system for maintaining a first surface of each of a plurality of roll formed parts relative to a second surface of the same roll formed part within a predetermined relation including:
  roll forming means for forming first and second surfaces of each of a plurality of roll formed parts relative to each other;
  measuring means for measuring the relation between the first and second surfaces of each of the roll formed parts after said roll forming means has completed formation of the relation between the first and second surfaces of each of the roll formed parts;
  first determining means for determining whether the measured relation is within the predetermined relation;
  second determining means for determining if the measured relation of each of a selected number of consecutive roll formed parts is not within the predetermined relation as determined by said first determining means;
  and adjusting means for adjusting said roll forming means in accordance with the relationship of the measured relation to the predetermined relation only if said second determining means has determined that the measured relation of each of the selected number of consecutive roll formed parts is not within the predetermined relation as determined by said first determining means.

2. The system according to claim 1 in which:
  said roll forming means includes a plurality of longitudinally spaces sets of forming rollers through which each of the roll formed parts is progressively advanced;
  each of said sets of rollers includes a plurality of part forming rollers arranged relative to each other;
  and said adjusting means includes position adjusting means for adjusting the position of at least one roller of at least one of said sets of rollers.

3. The system according to claim 2 in which said position adjusting means includes a motor connected to one of said part forming rollers of one of said sets of rollers to change its position relative to each part passing therethrough.

4. The system according to claim 3 in which said measuring means is disposed after the last of said sets of rollers at which each of the roll formed parts is initially formed.

5. The system according to claim 4 including data storage means for storing the amount of adjustment of said one part forming roller of one of said sets of rollers by said motor of said position adjusting means.

6. The system according to claim 2 in which:
  said position adjusting means includes a plurality of motors;
  and each of said motors is connected to a separate one of said part forming rollers to change its position relative to each part passing therethrough.

7. The system according to claim 6 in which said measuring means is disposed after the last of said sets of rollers at which each of the roll formed parts is initially formed.

8. A method for maintaining a first surface of each of a plurality of roll formed parts relative to a second surface of the same roll formed part within a predetermined relation including:
  roll forming a first surface of a roll formed part relative to a second surface of the same roll formed part of each of a plurality of the roll formed parts by progressively advancing each of the roll formed parts through a plurality of longitudinally spaced sets of rollers;
  non-manually measuring the relation between the first and second surfaces of each of the roll formed parts after completing formation of the relation between the first and second surfaces of each of the roll formed parts;
  non-manually determining whether the measured relation of each of the roll formed parts is within the predetermined relation;
  non-manually determining if the measured relation of each of a selected number of consecutive roll formed parts is not within the predetermined relation;
  and non-manually adjusting at least one roller of at least one of the sets of rollers in accordance with the relationship of the measured relation to the predetermined relation only if it has been non-manually determined that the measured relation of each of the selected number of consecutive roll formed parts is not within the predetermined relation.

9. The method according to claim 8 including:
  non-manually measuring the relation between the first and second surfaces of each of the roll formed parts after the last of the sets of rollers at which the roll formed part is formed;
  and non-manually adjusting the position of at least the one roller of at least the one set of rollers by activating a motor connected thereto.

10. The method according to claim 8 including storing in data storage means the position to which each adjustable roller is adjusted.

11. The method according to claim 8 including:
  non-manually measuring the relation between the first and second surfaces of each of the roll formed part after the last of the sets of rollers at which the roll formed parts is formed;
  and non-manually adjusting the position of each of a plurality of rollers by activating a separate motor connected to each of the plurality of rollers in accordance with the relationship of the measured relation to the predetermined relation.

12. A system for maintaining the angle between a first surface of a roll formed part and a second surface of the roll formed part within a predetermined angular range including:
  roll forming means for forming first and second surfaces of a roll formed part at an angle therebetween;
  measuring means for measuring the angle between the first and second surfaces of the roll formed part after said roll forming means has completed formation of the angular relation between the first and second surfaces;
  determining means for determining whether the measured angle between the first and second surfaces of the roll formed part is within the predetermined angular range;
  and adjusting means for adjusting said roll forming means in accordance with the relationship of the measured angle to the predetermined angular range.

13. The system according to claim 12 in which:
  said roll forming means includes a plurality of longitudinally spaced sets of forming rollers through which the roll formed part is progressively advanced;

each of said sets of rollers includes a plurality of part forming rollers arranged relative to each other;

and said adjusting means includes position adjusting means for adjusting the position of at least one roller of at least one of said sets of rollers.

14. The system according to claim 13 in which:

said position adjusting means includes a motor connected to one of said part forming rollers of one of said sets of rollers to change its position relative to each part passing therethrough;

and said measuring means is disposed after the last of said sets of rollers at which the roll formed part is initially formed.

15. The system according to claim 13 in which:

said positioning adjusting means includes a plurality of motors;

each of said motors is connected to a separate one of said part forming rollers to change its position relative to each part passing therethrough;

and said measuring means is disposed after the last of said sets of rollers at which the roll formed part is initially formed.

16. The system according to claim 14 in which said angle measuring means measures the angle between the first and second surfaces of the roll formed part at substantially the mid-point of the length of each of the first and second surfaces of the roll formed part.

17. The system according to claim 15 in which said angle measuring means measures the angle between the first and second surfaces of the roll formed part at substantially the mid-point of the length of each of the first and second surfaces of the roll formed part.

18. A method for maintaining the angle between first and second surfaces of a roll formed part relative to each other within a predetermined angular range including:

roll forming a first surface of a roll formed part relative to a second surface of the roll formed part at an angles therebetween by progressively advancing the roll formed part through a plurality of longitudinally spaced sets of rollers;

non-manually measuring the angle between the first and second surfaces of the roll formed part;

non-manually determining whether the measured angle between the first and second surfaces of the roll formed part is within the predetermined angular range;

and non-manually adjusting at least one roller of at least one of the sets of rollers in accordance with the relationship of the measured angle to the predetermined angular range.

19. The method according to claim 18 including non-manually measuring the angle between the first and second surfaces of the roll formed part after the last of the sets of rollers at which the roll formed part is formed.

20. The method according to claim 19 including non-manually measuring the angle between the first and second surfaces of the roll formed part at substantially the mid-point of the length of each of the first and second surfaces of the roll formed part.

* * * * *